United States Patent [19]

Takekoshi

[11] Patent Number: 5,181,467
[45] Date of Patent: Jan. 26, 1993

[54] AUTOMATIC DAMPENING WATER REPLENISHER

[75] Inventor: Tomoaki Takekoshi, Shizuoka, Japan

[73] Assignee: Fuji Photo Film Co., Ltd., Kanagawa, Japan

[21] Appl. No.: 645,446

[22] Filed: Jan. 24, 1991

[30] Foreign Application Priority Data

Jan. 26, 1990 [JP] Japan ............... 2-006483[U]

[51] Int. Cl.$^5$ ............................................. B41L 25/00
[52] U.S. Cl. ................................. 101/147; 101/366; 101/148; 101/451; 137/99
[58] Field of Search ............... 101/147, 148, DIG. 45, 101/364, 350, 451, 366; 137/8, 88, 100, 93, 99

[56] References Cited

U.S. PATENT DOCUMENTS

| | | | |
|---|---|---|---|
| 3,947,356 | 3/1976 | Werhli | 101/147 X |
| 4,151,854 | 5/1979 | Patsko | 137/3 |
| 4,234,443 | 11/1980 | Canale et al. | 252/135 |
| 4,388,864 | 6/1983 | Warner | 101/148 |
| 4,474,476 | 10/1984 | Thomsen | 101/451 |
| 4,570,538 | 2/1986 | Web | 101/148 |
| 4,762,772 | 8/1988 | Kobayashi et al. | 101/451 X |
| 5,003,352 | 3/1991 | Duchesne et al. | 101/366 X |

FOREIGN PATENT DOCUMENTS

3140760 8/1982 Fed. Rep. of Germany ....... 101/148
56-163535 12/1981 Japan .
63-303739 12/1988 Japan .
3-106694 5/1991 Japan .

Primary Examiner—Edgar S. Burr
Assistant Examiner—Christopher A. Bennett
Attorney, Agent, or Firm—Sughrue, Mion, Zinn, Macpeak & Seas

[57] ABSTRACT

The improved automatic dampening water replenisher has two flow sensors that respectively measure the flow rates of stock solution and diluent water which are to be mixed to prepare dampening water with which the tank of dampening water is to be replenished, and this enables the concentration of dampening water in its tank to be maintained within a predetermined range at all times. If desired, the apparatus (the replenisher) may be equipped either with components for computing, displaying and storing the total flows of stock solution and diluent water or with an emergency alarm generator which issues an alarm indicating the occurrence of aberrations in the concentration of dampening water in its tank. This offers the advantage that normal operation of the apparatus can be resumed as soon as power failure is remedied, or the suspension of water supply and other troubles can be readily identified and corrected to avoid unwanted variations in the concentration of the dampening water.

9 Claims, 5 Drawing Sheets

AUTOMATIC DAMPENING WATER REPLENISHER

BACKGROUND OF THE INVENTION

1. Field of the Invention

This invention relates to an apparatus for use in lithographic printing such as offset printing to automatically replenish dampening water. More particularly, this invention relates to an automatic dampening water replenisher with which the concentration of is conditioned to be within a predetermined range and can be automatically supplied into an associated tank or fountain in a lithographic printing press and which provides ease in troubleshooting.

2. Prior Art

Offset printing is a method of lithographic printing that makes use of the inherent immiscibility of water with grease. The surface of the printing plate used in this method consists of water-receptive areas that repel greasy ink and ink-receptive areas that repel water. The former are called "non-image" areas whereas the latter are "image" areas.

Dampening water used in lithographic printing wets the non-image areas to increase the difference in surface chemistry between the image and non-image areas, thereby widening the difference between the ink repulsion of the nonimage areas and the ink affinity of the image areas. Dampening water used for this purpose is prepared by diluting a stock solution, or an additive generally referred to as an "etch solution" (e.g. an acidic etch solution, an alkaline etch solution or an alcohol), with water to a concentration of 0.1–1 wt % or 0.1–5 wt %. To insure consistent printing operations, various chemicals are usually incorporated in the etch solution and they include a desensitizer for greases at the non-image areas of the plate, a pH modifier, a pH buffer, a cleaning agent, a wetting agent, a chelating agent, an antiseptic and an alcohol. Water that is used as a diluent may be tap water, industrial water or well water.

Specific examples of common dampening water are aqueous solutions consisting of water and small amounts of stock solutions containing alkali metal salts of bichromic acid or ammonium bichromate, phosphoric acid or salts thereof such as an ammonium phosphate, or colloidal materials such as gum arabic and carboxymethyl cellulose (CMC). Since etch solutions are used as additives for dampening water in very small amounts compared to the diluent water, it is considerably difficult to control their concentration to lie within an appropriate range. Even a slight variation in the concentration of each solutions will tend to upset the balance between printing ink and dampening water, causing various troubles in printing operations, including scumming, smudging, trapping on roller surfaces, roller stripping, delayed setting and drying, deteriorated gloss and poor dot reproduction.

An aqueous solution containing ca. 20–25% isopropyl alcohol (IPA) has also been used as dampening water. However, isopropyl alcohol is so volatile that maintaining its concentration at a constant level is very difficult unless an expensive device is used. In addition, isopropyl alcohol which has not only an unpleasant odor but is also toxic is not desirable today when there is a growing concern over environmental pollution caused by industrial activities.

Under these circumstances, various methods and apparatus have been used or proposed for adjusting the concentration of additives in dampening water to lie within appropriate ranges. Offset printing machines are usually equipped with an apparatus for cooling and circulating dampening water which is stored in a tank of its own. The tank of dampening water is supplied with a stock solution and diluent water which are mixed to prepare dampening water of a given concentration. Conventionally, the concentration of dampening water is maintained at a constant level by measuring the pH or electroconductivity of the dampening water in the tank or, if IPA is used as an additive, by adjusting its concentration with a hydrostatic controller using a float. However, these methods are incapable of precise performance in a consistent way.

To solve these problems, an apparatus that uses a metering pump to replenish the stock solution and mix it with diluent water has been proposed in Japanese Patent Publication (kokai) No. 39463/1980 but it involves a complicated mechanism and is not easy to use. An apparatus for mixing and feeding dampening water automatically by adjusting the quantity of the stock solution using both a metering pump and a timer that controls its working time has been proposed in Japanese Utility Model Application(kokai) No. 163535/1981 but the volume of neither diluent water nor stock solution can be adjusted with sufficient correctness to maintain the concentration of dampening water at a constant level. A method and apparatus that meters diluent water and chemical solutions on a weight basis have been proposed in Japanese Patent Application (kokai) No. 303739/1988 but they are also complicated in mechanism and are difficult to use.

The dampening water conventionally used in the various replenishing apparatus described above has a serious defect in that it does not wet the non-image areas of a printing plate uniformly, causing occasional smudging of the print. In addition, considerable skill has been necessary to properly adjust the amount of dampening water to be supplied.

With a view to solving these problems, the assignee proposed in Japanese Patent Application No. 243613/1989 a compact and inexpensive apparatus and method for replenishment that used novel dampening water that was free from the toxicity and safety problems, that was easy to handle and that was highly stable, which apparatus and method were capable consistently metering and feeding predetermined quantities of diluent water and stock solution into a dampening water tank in a device for cooling and circulating dampening water. The replenishing apparatus proposed in that patent application has the advantage that the dampening water it provides has better physical properties than what was previously used and that it maintains constant concentrations with fairly high precision. However, the apparatus uses a metering pump as a means of feeding the stock solution for dampening water and the metering of the solution which is performed by controlling the working time of the pump is subject to great variations, which limit the efforts to further improve the precision with which the concentration of dampening water can be held constant. Furthermore, the metering pump can sometimes idle and this has been another cause of the low precision of the apparatus.

As a further problem, none of the prior art apparatus for replenishing dampening water have means of calculating, displaying and storing the integrated (total) flow rates of water and stock solution or the concentration of dampening water as computed from those integrated flow rates. If the main power supply is cut off on account of either power failure or the occurrence of trouble in the apparatus or printing press, there is no way to know the integrated flow rates of water and stock solution or the concentration of dampening water, and this necessitates repeating the overall procedure of preparing dampening water in the tank or considerable difficulty is involved in identifying the cause of the trouble.

SUMMARY OF THE INVENTION

A first object, therefore, of the present invention is to provide an automatic dampening water replenisher which, when the amount of dampening water in its tank decreases below a certain level, is capable of automatically feeding appropriate amounts of diluent water and stock solution in such a way that the concentration of dampening water in the tank will lie within a predetermined range in a correct way.

A second object of the present invention is to provide an automatic dampening water replenisher which, in addition to the capability described above, has the ability to monitor the integrated flow rates of diluent water and stock solution and the concentration of dampening water and which, even in the case of power failure or other machine troubles that cause the main power supply to be cut off, is adapted to indicate the concentration of dampening water in the tank on the basis of the stored data on said integrated flow rates and concentration, with the added advantage of permitting the cause of troubles to be easily identified.

A third object of the present invention is to provide an automatic dampening water replenisher which, in addition to the capabilities described above, has the ability to maintain the concentration of dampening water within a predetermined range even if something abnormal occurs to the supply of diluent water such as its suspension or excessive flows and which is adapted to issue an emergency alarm if such abnormal events occur.

The first object of the present invention can be attained by an automatic dampening water replenisher of the first embodiment of the present invention, which comprises: a tank accommodating a stock solution for dampening water; a pump for feeding the stock solution in said tank to a tank accommodating dampening water to be used in an offset printing press; a sensor for measuring the flow rate of the stock solution being fed by means of said pump; a sensor for measuring the flow rate of diluent water being admitted from a water supply unit; a solenoid valve for controlling the flow of diluent water into said tank of dampening water; level sensors for detecting the liquid levels in said tank of stock solution and said tank of dampening water; and a control unit which, on the basis of detection signals from said four sensors, controls the feed rate of said stock solution pump and the input flow of diluent water through said solenoid valve so that the concentration of dampening water in its tank is always held within a predetermined range.

Preferably, said stock solution contains at least one compound that has ethylene oxide and/or propylene oxide added to a monoalcohol or diol of an alkane or alkene having 7-12 carbon atoms.

Preferably, said dampening water contains at least one of said compounds in an amount of 0.1-5 wt %.

The second object of the present invention can be attained by an automatic dampening water replenisher of the second embodiment of the present invention which, in addition to the components described above, further includes a means of calculating the total flows of stock solution and diluent water measured by the associated flow sensors, a means of displaying the calculated total flows of stock solution and diluent water, and a means of storing those total flows.

Preferably, said storage means is a non-volatile memory.

Preferably, said storage means is a memory that is operable not only on a main power supply to the housing of said replenisher but also on a battery serving as a backup power source.

Preferably, said display means is also capable of displaying the concentration of dampening water.

The third object of the present invention can be attained by an automatic dampening water replenisher of the third embodiment of the present invention which, in addition to the components of the first or second apparatus, further includes an emergency alarm generator and when said replenisher starts automatic replenishment of stock solution and diluent water in response to a dampening water deficiency signal from the sensor of the liquid level in the tank of dampening water, said control unit is operated in such a way that as soon as it receives the dampening water deficiency signal, it drives the solenoid valve to open the channel of diluent water and if the flow of diluent water as determined from a detection signal from the associated flow sensor after the passage of a predetermined delay time is within a predetermined range, it starts to drive the stock solution pump whereas if said flow of diluent water is outside the predetermined range, it allows said emergency alarm generator to issue an emergency alarm.

Preferably, said emergency alarm generator will issue an alarm when the concentration of dampening water deviates from a predetermined appropriate range.

DETAILED DESCRIPTION OF THE INVENTION

The automatic dampening water replenisher, that is, the apparatus of the present invention for automatically replenishing dampening water is described below in detail with reference to the preferred embodiment shown in the accompanying drawings.

Figure 1:
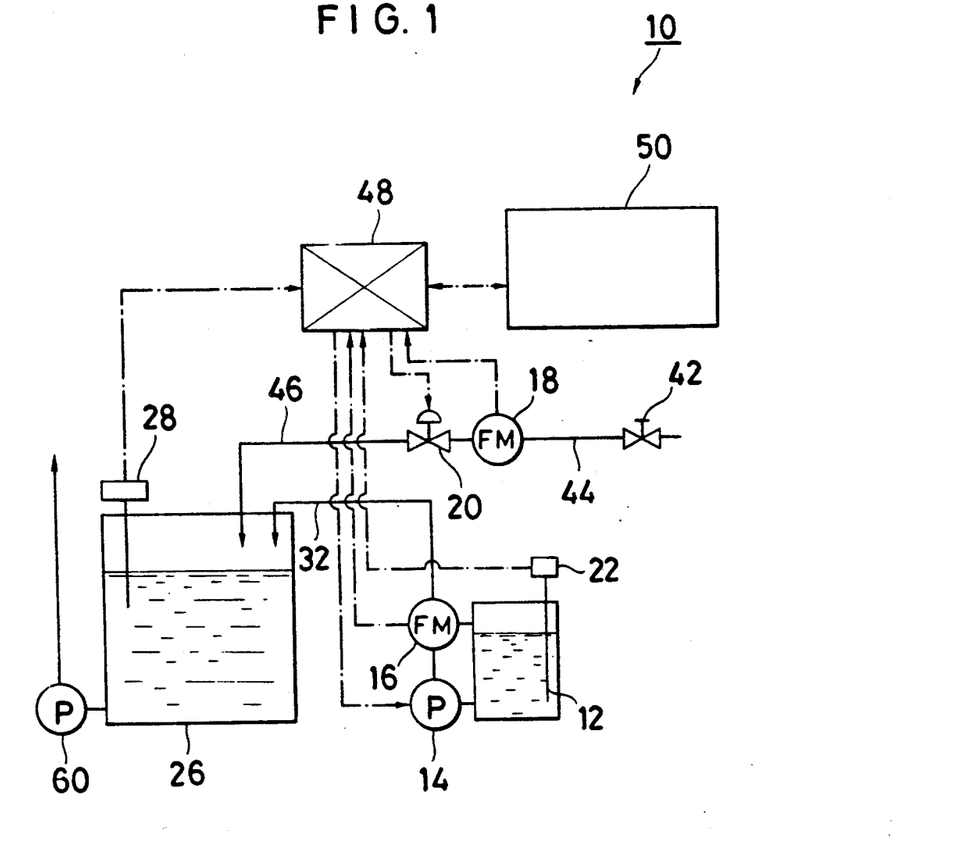
FIG. 1 is a block diagram showing an example of the basic configuration of the automatic dampening water replenisher in accordance with the present invention.
Figure 2:
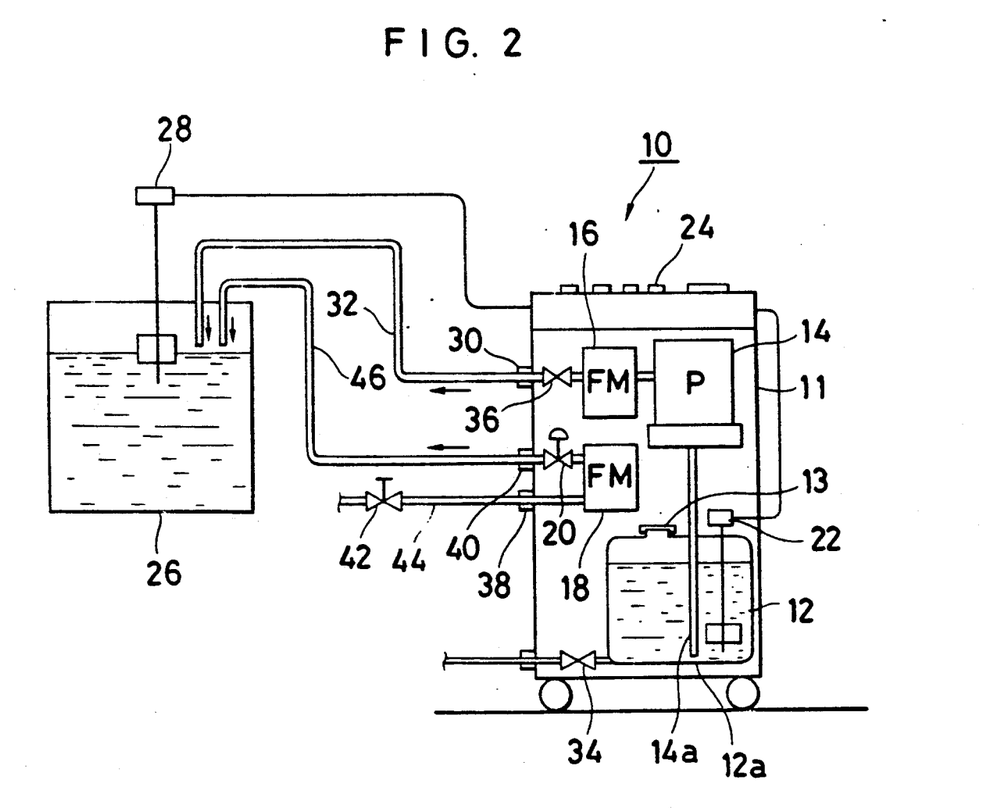
FIG. 2 is a schematic view showing the construction of the replenisher shown in FIG. 1.

FIG. 1 is a block diagram showing the basic configuration of the automatic dampening water replenisher according to the preferred embodiment of the present invention, and FIG. 2 is a schematic view showing the construction of this replenisher.

As shown, the automatic dampening water replenisher (hereinafter sometimes referred to simply as "apparatus") generally indicated by 10 comprises basically; a housing 11 that contains a tank 12 of stock solution, a pump 14 for stock solution, a sensor 16 for the flow of stock solution, a sensor 18 for the flow of diluent water, a solenoid valve 20, and sensor 22 for detecting the liquid level in the tank 12; a control box 24 that is provided on top of the housing 11 and that includes a control unit, a setting unit, a display unit, a memory unit, etc.; a tank of dampening water 26; and a sensor 28 that is connected to the tank 26 for detecting its liquid level.

In the example shown in FIGS. 1 and 2, a suction pipe 14a on the pump 14 is inserted into the tank 12 in such a way that its suction end 12a comes close to the bottom of the tank 12. A nozzle 30 for discharging the stock solution for dampening water is provided in the upper part of the lateral side of the housing 11. The output end of the pump 14 is connected to the input end of the sensor 16 by means of a pipe and the output end of the sensor 16 is also connected via a pipe to the nozzle 30. The nozzle 30 is connected to the outside of the housing 11 via supply pipe 32 which extends into the tank 26 where its terminal end opens to the dampening water in the tank 26. With the line for supplying the stock solution from the tank 12 to the dampening water tank 26 being constructed in the manner described above, the connection pipes and the supply pipe 32 may be composed in any conventional form that will not adversely affect the stock solution, such as metal pipe, resin pipe, rubber pipe, various kinds of hoses, or a flexible pipe.

As shown in FIG. 2, the tank 12 is provided with a valve 34 and this is an optional element that can be closed or opened to facilitate various operations including the replacement of stock solution in the tank 12, cleaning of the tank 12 and replacement of that tank by shutting off the flow channel of stock solution or permitting the stock solution to flow out of the tank 12.

The apparatus 10 shown in FIG. 2 is also equipped with a check valve 36 which is another optional element and that is provided between the output end of the sensor 16 and the discharge nozzle 30.

A water intake nozzle 38 and a supply nozzle 40 are provided on the lateral side of the housing 11. A suitable intake pipe 44 is provided between the nozzle 38 and a supply valve 42 connected to an external water supply unit (not shown) such as a city water supply system. within the housing 11, intake nozzle 38, flow sensor 18, solenoid valve 20 and supply nozzle 40 are interconnected, in the order written, by associated pipes. Outside the housing 11, supply nozzle 40 is connected to supply pipe 46 which extends into the tank 26 where its terminal end opens to the dampening water in the tank 26. With the line for supplying diluent water from the valve 42 on the water supply unit (not shown) to the dampening water tank 26 being constructed in the manner described above, the connection pipes, intake pipe 44 and supply pipe 46 may be composed in any conventional form that will not adversely affect the diluent water, such as metal pipe, resin pipe, rubber pipe, various kinds of hoses, or a flexible pipe.

The tank 12 in the apparatus of the present invention may be fixed within the housing 11 in such a way that a replenishing stock solution for dampening water is supplied either from the top with a cover 13 being removed or through a suitable connecting port. Alternatively, the tank 12 may be installed in such a way that it can be entirely replaced as required.

The pump 14 is a means of feeding the stock solution into the tank of dampening water 26 and it may be of any type that is capable of providing the necessary pressure or head for feeding the stock solution. The feed rate of this pump may be fixed or variable but it is desirably capable of permitting the stock solution to be delivered in a quantity that is exactly the same as the set value. For precise control of flow rate, a positive displacement pump is preferred and known types can be used, including a bellows pump, a tubing pump, a diaphragm pump, a plunger pump and a reciprocating piston pump.

The sensors 16 and 18 may be of any type that are capable of measuring the flow rates of passing the stock solution and the diluent water, respectively, and that output the results of measurement as electric signals, say, flow digital signals each being in the form of pulses related to predetermined sampling times. While many conventional flowmeters including positive displacement flowmeter, a vane-wheel type flowmeter and an area flowmeter can be used, representative examples are vane-wheel type flowmeter that detects the rotation of vane wheel by a suitable means such as a magnetic sensor, as well as a gear type positive displacement flowmeter that uses a photosensor or some other suitable device.

Thus, the flow rate of stock solution that is transferred from the tank 12 to be discharged into the tank 26 is correctly measured by the flow sensor 16 which outputs the result of measurement as an electric signal. Further, the flow rate of diluent water that flows out of an external water supply unit such as a city water supply system to be discharged into the tank 26 is correctly measured by the flow sensor 18 which also outputs the result of measurement as an electric signal.

Solenoid valve 20 controls the quantity of diluent water flowing into the tank 26 so that the concentration of dampening water in the tank 26 will always be held within a predetermined range. While any known solenoid valve may be used, one which is capable of fine control is preferred.

The level sensors 22 and 28 may be of any type that are at least capable of generating electric signals when the volumes of stock solution in the tank 12 and dampening water in tank 26, respectively, decrease until the levels of those liquids become lower than predetermined values. As the sensors for this purpose, the sensors sensing by means of physical properties (phenomena) including pressure, buoyancy, electricity, light, ultrasonic waves, etc. can be used. The sensors may be adapted to generate electric signals in association with various parameters including not only the lower limit of liquid level but also its upper level, as well as instantaneous values of liquid levels and the changes in the liquid level (i.e. the amounts of its decrease and increase). The level sensor 22 is installed in a predetermined position with respect to the tank 12 whereas the level sensor 28 is installed in a predetermined position with respect to the tank 26.

Figure 3:
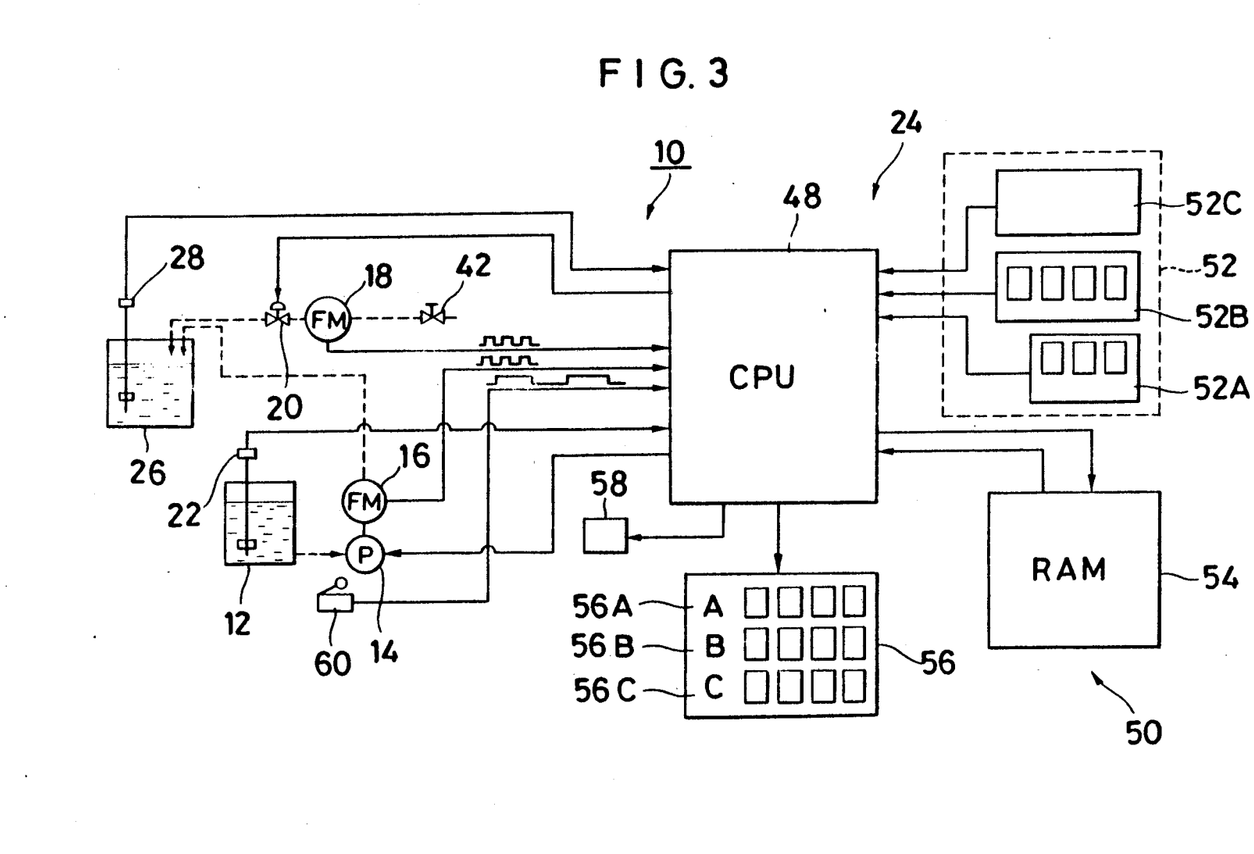
FIG. 3 is a block diagram showing an example of the control unit in the replenisher shown in FIG. 1.

As shown in FIG. 3 in detail, the control box 24 consists basically of a control unit 48 and a manipulating unit 50, the latter being composed of a setting section (unit) 52, a memory section (unit) 54, a display section (unit) 56 and an emergency alarm generator 58.

The control unit 48 is electrically connected so as to receive signals from the respective sensors 16, 18, 22 and 28 while sending control signals to the pump 14 and the solenoid valve 20. The control unit 48 is also connected electrically to the manipulating unit 50. The control unit 48 is a computing and control means that receives various detection signals and preset signals and which transmit various control signals and the results of computation. The control unit 48 is in the form of a CPU (central processing unit). Suppose here that level sensor 28 generates a signal indicating that the liquid level in the tank 26 has become lower than a predetermined value. Then, in response to that signal, control unit 48 sends a drive signal to pump 14 and solenoid valve 20, starting the replenishment of the tank 26 with stock solution and diluent water. In this instance, the sensors 16 and 18 detect the flows of stock solution and diluent water being replenished and send corresponding pulse signals to the control unit 48, which counts the issued pulse signals and controls the pump 14 and solenoid valve 20 in such a way that the replenishment will cease when the count has reached the number of pulses that corresponds to the preset amount of a single replenishment.

If, on the other hand, the liquid level in the tank 12 has become lower than a predetermined value, the level sensor 22 generates a signal indicating that the volume of stock solution in that tank 12 has decreased below a predetermined level. In response to this signal, the control unit 48 causes the alarm generator 58 to issue a stock solution deficiency alarm that requests the supply of an additional amount of stock solution. If the pump 14 and the solenoid valve 20 are in operation, the alarm signal causes the pump 14 and solenoid valve 20 to stop operating, thereby suspending the replenishment of tank 26 with stock solution and diluent water. In this case, the numbers of pulses that correspond to the volume of stock solution and diluent water that have been supplied into the tank 26 just before the pump 14 and solenoid valve 20 were caused to stop operating are stored in the control unit 48. If the operation of pump 14 and solenoid valve 20 is resumed after supplying an additional amount of stock solution into the tank 12 following the issuance of a stock solution deficiency signal from the alarm generator 58, the flow pulse signals are counted subsequent to the stored numbers of pulses and the pump 14 and solenoid valve 20 are controlled to be driven in such away that the tank 26 will be replenished with exact predetermined amounts of stock solution and diluent water.

The water supply unit such as a city water supply system may sometimes experience a trouble such as the failure of water supply, turning on a signal for requesting the replenishment of dampening water in response to a dampening water deficiency signal from the level sensor 28 on the tank 26. If, in this case, the solenoid valve 20 and the pump 14 are driven simultaneously and the tank 26 is replenished with the stock solution alone, an excessive increase in the concentration of dampening water in that tank 26 will occur.

Figure 4:
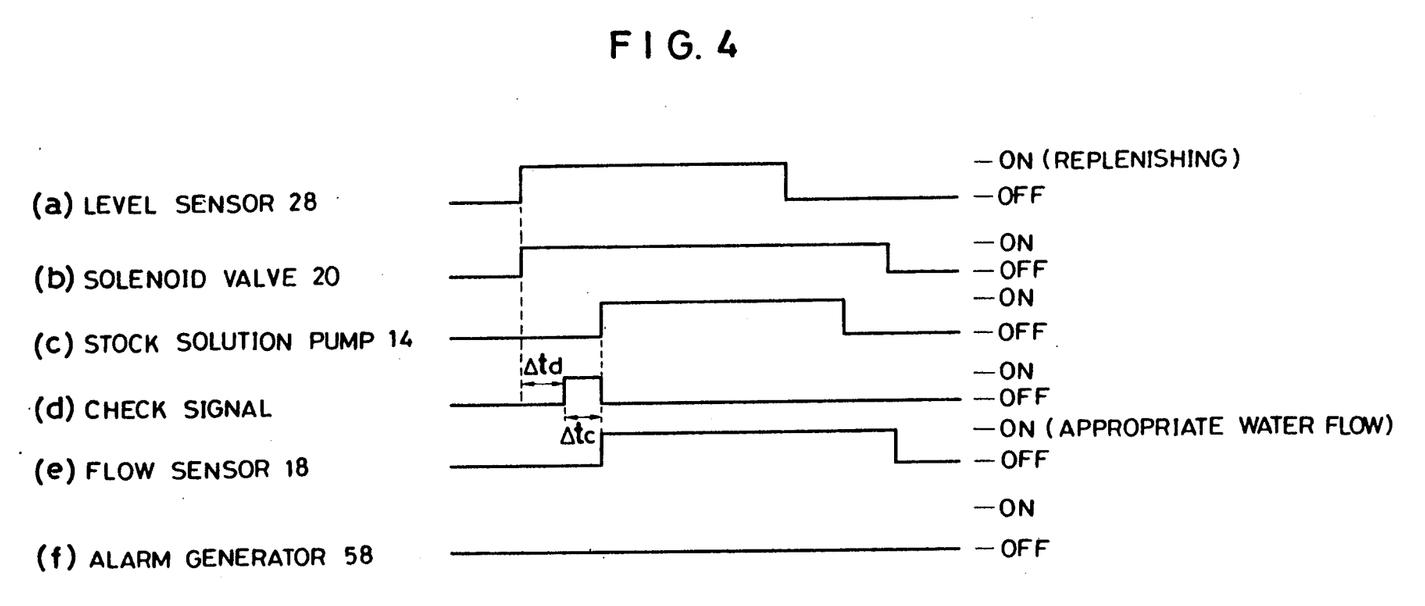
FIG. 4 is a timing chart showing the operation of the individual parts of the automatic dampening water replenisher of the present invention in normal mode.
Figure 5:
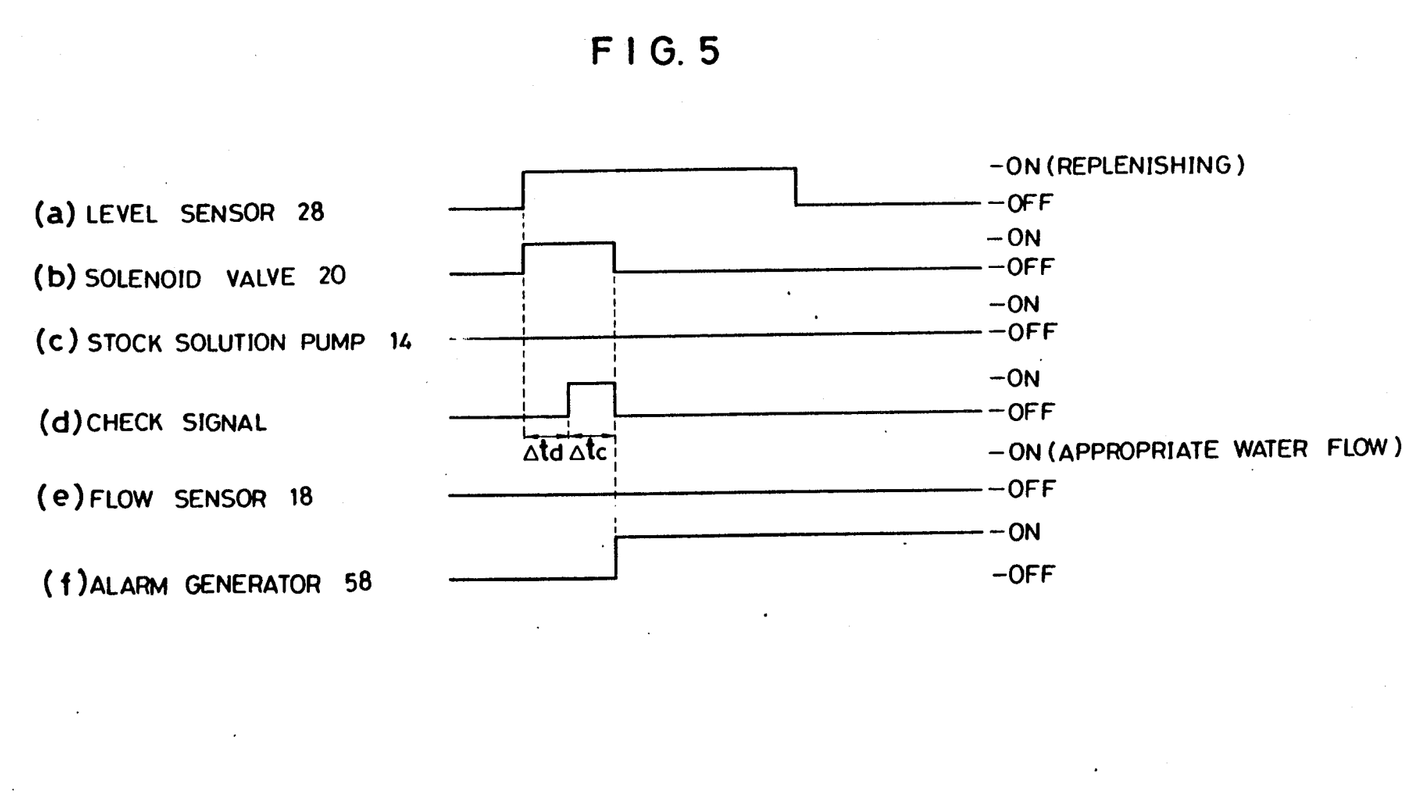
FIG. 5 is a timing chart showing the operation of the individual parts of the replenisher of the present invention when a trouble has occurred.

To deal with this problem, the apparatus 10 of the present invention may be so adapted that the control unit 48 operates as shown in FIGS. 4 and 5 when the tank 26 is automatically replenished with dampening water.

FIG. 4 is a timing chart showing the normal mode of automatic replenishment as performed by the apparatus 10 shown in FIG. 3, whereas FIG. 5 is a timing chart for the case where a trouble such as the failure of water supply has occurred during automatic replenishment by the apparatus 10. In each of FIGS. 4 and 5, (a) denotes a dampening water deficiency signal from the level sensor 28 that is represented as a signal for requesting the replenishment of dampening water; (b) denotes a signal for driving the solenoid valve 20 which closes or opens the flow channel of diluent water; (c) denotes a signal for driving the pump 14 which feeds the stock solution of dampening water; (d) denotes a check signal which represents the timed checking of water flow; (e) denotes a signal indicating that the flow detected by sensor 18 is appropriate; and (f) denotes a signal for driving the alarm generator 58.

In the case where dampening water is automatically replenished in a normal way, the control unit 48 turns on (drives) the solenoid valve 20 to open the flow channel of diluent water when signal (a) turns on in response to a dampening water deficiency signal from the level sensor 28. Subsequently, the control unit 48 delays signal (a) by a predetermined time $\Delta t_d$, say, two seconds after it is turned on, and the control unit 48 turns on check signal (d) so that the flow signal (pulse count) from the flow sensor 18 will be checked for predetermined time $\Delta t_c$, say 2 seconds [i.e., 2–4 seconds after signal (a) turned on]. Delaying of signal (a) is necessary for the following reason: even in the case of a failure of water supply or some other trouble in the water supply system, water that collected in the area of a pipe 44 that is near the solenoid valve 20 will flow into the sensor 18 in a transient period, for example, the first two seconds just following the opening of the solenoid valve 20, thereby permitting the sensor 18 to issue a flow signal, but the flow of such water will soon decrease until the sensor 18 no longer issues a water flow signal (in pulse form). Under these circumstances, the duration of the above-described transient response is set as a delay time, $\Delta t_d$, and during this period the water flow is not checked for any abnormal phenomenon such as the failure of water supply, whereby the pump 14 is prevented from operating erroneously to insure that the concentration of dampening water will not deviate from the appropriate range to become either too high or too low.

The control unit 48 checks the flow signal that is issued from the sensor 18 during the predetermined check time $\Delta t_c$. If the flow signal is appropriate (i.e., the pulse count is appropriate), the control unit 48 turns on signal (e) immediately after the end of the check period, whereupon signal (c) for driving the pump 14 turns on to have the stock solution supplied into the tank 26. Needless to say, the alarm generator 58 remains off throughout the process described above.

When predetermined amounts of diluent water and stock solution have been supplied into the tank 26 [i.e., when the numbers of pulses have reached their respective predetermined values (integrated or total flows)], the control unit 48 will turn off the solenoid valve 20 and pump 14 (make them no longer driven).

Even if signal (b) for driving the solenoid valve 20 is turned on in response to the turning on of signal (a) requesting automatic replenishment, a failure of water supply or some other trouble may prevent the water flow from reaching an appropriate level within the predetermined check period $\Delta t_c$ [i.e., as shown in FIG. 5, the flow signal from the sensor 18 will not become appropriate or an appropriate number of pulses have not been counted, whereby signal (e) will not turn on even if check signal (d) turns off]. In this case, the control unit 48 will immediately turn on the alarm generator 58 so that it will generate an emergency alarm. Needless to say, pump 14 remains off throughout the process described above. Signal (b) for driving the solenoid valve 20 will turn off as soon as or some time after alarm signal was generated.

The apparatus of the present invention may be so adapted that it will generate an emergency alarm not only in the failure of water supply but also in the case where the flow of diluent water is excessive, as when it exceeds the capacity of flow sensor 18 (i.e. the numbers of pulses are more than it can count), thereby turning off signal (b) for driving the solenoid valve 20 so that the flow channel of water is shut off.

While the system of checking the flow of diluent water in the apparatus of the present invention is constructed in the manner described above, it should be noted that checking of the water flow is not necessarily performed solely at the time when automatic replenishment of dampening water is started; checking may also be made during automatic replenishment of dampening water in such a way that the water flow is automatically checked at suitable intervals during the check period $\Delta t_c$.

Constructed in the manner described above, the automatic dampening water replenisher of the present invention is capable of notifying the operator of the occurrence of a trouble in the supply of diluent water by means of providing an alarm and, in response to the occurrence of the trouble, the replenisher may automatically control the solenoid valve and the stock water pump to be driven in such a way as to prevent the concentration of dampening water in its tank from becoming too high or too low.

Setting section 52 in the manipulating unit 50 (see FIG. 3) includes a device 52A for setting the flow rate of stock solution, a device 52B for setting the flow rate of diluent water, and a device 52C for setting the concentration of dampening water, the range of permissible variations in its concentration and the various other parameters necessary for the operation of the entire system. The setting section 52 is so adapted that the values set by those devices are transmitted to the control unit 48 as electric signals. Necessary inputs may be entered into the respective setting devices either directly (manually) or through manipulation on a keyboard or other input devices. The values of setting may be displayed on the respective devices in the setting section 52 either mechanically or electrically as soon as they are set by those devices. Alternatively, the set values may be displayed on the separate display section 56 to be described below.

The memory section 54 in the manipulating unit 50 stores the values set on the setting section 52, the total values of flow rates of stock solution and diluent water that have been computed in the control unit 48 on the basis of the flow signals detected with the flow sensors 16 and 18, as well as the concentration of dampening water and any other data that is necessary to operate the apparatus 10. The memory section 54 is composed of memories such as RAMs but ROMs may be used as required. At least the memory that is used to store the integrated (total) flows of stock solution and diluent water is preferably in the form of a memory that is capable of retaining the stored data even if the main power supply to the housing 11 is cut off on account of power failure or other troubles in the lithographic printing press or the apparatus of the present invention. Examples of such memories are non-volatile memory and the combination of a backup power source such as a primary or secondary battery with a memory that is to be operated on the backup power source.

The display section 56 in the manipulating unit 50 includes basically a display 56A of the total (integrated) flow of stock solution A that has been computed in the control unit 48 on the basis of the flow signal detected with the flow sensor 16, a display 56B of the total flow of diluent water B that has also been computed in the control unit 48 on the basis of the flow signal detected with the flow sensor 18, and a display 56C of the concentration of dampening water C that has been computed from the total flows of stock solution and diluent water.

There are many other parameters or events that can be displayed on the display section 56 and they include: the amount of stock solution or its liquid level in the tank 12 that have been informed from the control unit 48 on the basis of the level detection signal from the level sensor 22; an alarm for the deficiency of stock solution in the tank 12 or a request for replacing the tank 12 or replenishing the stock solution in the tank 12; the amount of dampening water or its liquid level in the tank 26 that have been informed the control unit 48 on the basis of the level detection signal from the level sensor 28; the active operation of the apparatus 10; alarms for various troubles; the values set on the setting section 52; various numeric values computed from those settings; and any other data that is necessary or convenient for the purpose of operating and using the apparatus 10.

The displays 56A, 56B and 56C may be composed of any known display devices including neon tubes, fluorescent displays, liquidcrystal displays, LEDs and mechanical counters.

There also is no limitation on the type of emergency alarm generator 58 that can be used in the present invention and it may be composed of any known device such as a buzzer, a bell or an electronic sound generator. If desired, alarms may be issued in different ways depending on the kind of troubles that occurred and this is preferred since it enables troubleshooting to be performed in a much easier manner.

In other embodiments, the apparatus of the present invention may be so adapted that when the concentration of dampening water deviates from the appropriate range, or when the liquid level of stock solution in the tank 12 drops below a predetermined value or when a trouble occurs in the printing press or the apparatus, that event as well the location of the trouble are displayed on the display section, with associated alarms being optionally issued from the emergency alarm generator 58.

The memory section 54 and display section 56 are shown as separate entities in FIG. 3 but this is not the sole case of the present invention and a power failure storing/integrating counter or some other device may be used to insure that necessary data is stored and displayed simultaneously.

If a metering pump is used as stock solution pump 14 in the apparatus shown in FIG. 3, the flow sensor 16 may be replaced by a microswitch 60 or some other suitable device which, for calibration and other purposes, counts the number of strokes in the metering pump to produce a signal from computing the flow rate of stock solution.

The stock solution and dampening water to be used in the present invention are in no way limited and any known stock solutions (additives) and dampening water prepared by diluting them with water can be used. Particularly preferred are the stock solution and dampening water that are described in commonly assigned Japanese Patent Application No. 243613/1989, which stock solution contains at least one compound that has ethylene oxide and/or propylene oxide added to a monoalcohol or diol of an alkane or alkene having 7-12 carbon atoms, with said dampening water containing at least one of such compounds in an amount of 0.1-5 wt %.

The automatic dampening water replenisher of the present invention offers a particular benefit when used in situations such as those described above where it is difficult to detect the concentration of dampening water by specific gravity since the stock solution and dampening water have similar values of specific gravity which are close to 1, the specific gravity of water.

The diluent water that can be used in the present invention also is not limited in any particular way and ordinary tap water, well water, industrial water, etc. may be used.

OPERATION

Having the basic construction described on the foregoing pages, the automatic dampening water replenisher 10 of the present invention will operate in the following manner.

First, the flow of stock solution and diluent water per unit time or their flows integrated for one cycle of replenishment are set on devices 52A and 52B, respectively, in the setting section 52 of the manipulating unit 50. If necessary, the concentration of dampening water and other parameters are set on device 52C in the setting section 52. The thus set values are processed in control unit 48 and subsequently stored in memory section 54.

Referring to FIG. 1, if level sensor 28 detects the fact that the level of dampening water in tank 26 has dropped below a predetermined value while dampening water is supplied to a lithographic printing press (not shown) by means of pump 60, the detection signal is transmitted to control unit 48, which then drives pump 14 and solenoid valve 20 in such a way that the flows of stock solution and diluent water or the concentration of dampening water will reach the respective preset values.

The stock solution in tank 12 as drawn by means of pump 14 is guided through the supply line consisting of flow sensor 16, discharge nozzle 30 and feed pipe 32 to be fed into the dampening water tank 26, whereas diluent water supplied through valve 42 is guided through the supply line consisting of intake pipe 44, intake nozzle 38, flow sensor 18, solenoid valve 20, feed nozzle 40 and feed pipe 46 to be fed into the same tank 26.

The flow sensor 16 detects the flow of stock solution and the flow sensor 18 detects the flow of diluent water. The two sensors send the respective outputs as pulse signals (see FIG. 3) to control unit 48, which computes the total flows of stock solution and diluent water, as well as the concentration of dampening water based on those total values, which three values are displayed on displays 56A, 56B and 56C, respectively, in display section 56. If any one of these values deviates from the preset values or ranges, the control unit 48 will give off pertinent alarms and display the faulty area.

If the level of stock solution in tank 12 drops below the predetermined value during the operation of the apparatus 10, the level sensor 22 sends an error signal, whereupon the control unit 48 turns off the pump 14 and solenoid valve 20 to stop the replenishment of the tank 26 with additional supplies of stock solution and diluent water. At the same time, the control unit 48 issues a stock solution deficiency alarm and displays that event. Looking at the display, the user (or the operator) can immediately take the necessary action such as the replenishment of stock solution or replacement of the stock solution tank.

Further, at least the integrated or total flows of stock solution and diluent water are stored in the memory section 54 in either a memory connected to a backup power source or a non-volatile memory (preferably they are displayed on the display section 56). Hence, even if power failure occurs or even if the main power supply to the printing press or the apparatus of the present invention has to be turned off on account of troubles that have occurred in those machines, not only can normal operation be resumed right after power comes on but also troubleshooting (location and repair of the troubles) can be readily accomplished.

While the basic construction of the automatic dampening water replenisher of the present invention has been described on the foregoing pages, it should be understood that the invention is by no mean limited to the discussed embodiments and that various modifications and design alterations are of course possible without departing from the spirit and scope of the invention. For example, the means of computing, displaying and storing the total flows of stock solution and diluent water may be omitted as in the apparatus of the first embodiment of the present invention.

As described hereinabove in detail, the flow rates of both stock solution and diluent water are measured with flow sensors in the first embodiment of the present invention and this not only contributes to a substantial improvement in the precision of metering but also prevents the occurrence of errors that frequently accompany measurements with metering pumps. Hence, even if idling occurs, the concentration of dampening water can be maintained at an appropriate level, thereby insuring substantial improvements in reliability.

This advantage is retained in the second embodiment of the present invention and, in addition, even if the main power supply is cut off due to power failure or the occurrence of troubles, the integrated flows of stock solution and diluent water are stored such as in non-volatile memory and they can be displayed as required. Hence, not only can normal operation of the apparatus (automatic dampening water replenisher) be resumed as soon as power comes on but also the location and repair of troubles can be readily accomplished.

All of these advantages are retained in the third embodiment of the present invention. Furthermore, even if something abnormal occurs in the water supply unit such as a failure of water supply or excessive water supply, the supply of diluent water is automatically checked and if a certain trouble is found to have occurred, the solenoid valve and the pump of stock solution are controlled in such a way that the flow channel of diluent water or stock solution is either opened or closed as appropriate, whereupon an associated alarm is immediately issued to prevent the concentration of dampening water from becoming too high or too low.

In whichever embodiment, the apparatus of the present invention permits dampening water to be replenished automatically so that if the amount of stock solution in its tank has dropped below a predetermined level, it can be readily replenished with additional stock solution. Therefore, the apparatus of the present invention for automatically replenishing dampening water is very convenient for users.

What is claimed is;

1. An automatic dampening water replenisher for an offset printing press comprising:
    a first tank for storing a stock solution;
    a second tank for storing dampening water;
    a pump for transferring said stock solution from said first tank to said second tank;
    a first flow rate sensor for measuring a flow rate of said stock solution being fed from said first tank to said second tank by said pump;
    a second flow rate sensor for measuring a flow rate of diluent water being supplied to said second tank;
    a solenoid valve for controlling a flow of said diluent water into said second tank of dampening water;
    first and second level sensors for respectively detecting a level of said stock solution in said first tank and a level of said dampening water in said second tank; and
    a control means, responsive to outputs of said first and second flow rate sensors and said first and second level sensors, for controlling a feed rate of said stock solution pump and an input flow of said diluent water through said solenoid valve so that the concentration of said dampening water in said second tank is maintained within a predetermined range.

2. An automatic dampening water replenisher according to claim 1 wherein said stock solution is a composition comprising compounds A and B, wherein said compound A is selected from the group consisting of: a monoalcohol of an alkane having from 7-12 carbon atoms, a monoalcohol of an alkene having from 7-12 carbon atoms, a diol of an alkane having from 7-12 carbon atoms, and a diol of an alkene having from 7-12 carbon atoms;
    and where said compound B is selected from the group consisting of: a compound having ethylene oxide, a compound having propylene oxide, and a compound having ethylene oxide and propylene oxide.

3. An automatic dampening water replenisher according to claim 2 wherein said dampening water comprises at least one of said compounds in an amount of 0.1-5 wt %.

4. An automatic dampening water replenisher according to claim 1 further comprising: means for calculating a total flow of said stock solution and a total flow of said diluent water measured by the associated flow rate sensors, a means for displaying said calculated total flow of said stock solution and said calculated flow of said diluent water, and means for storing said calculated total flows.

5. An automatic dampening water replenisher according to claim 4 wherein said storage means comprises a non-volatile memory.

6. An automatic dampening water replenisher according to claim 4 further comprising a housing and wherein said storage means comprises a memory, a main power supply of said housing; a battery serving as a backup power source of said housing; said memory being operable on said main power supply of said replenisher and on said battery.

7. An automatic dampening water replenisher according to claim 4 wherein said display means is also capable of displaying a concentration of said dampening water.

8. An automatic dampening water replenisher according to claim 1 or 4 further comprising an emergency alarm generator and wherein said control means comprises means, responsive to a dampening water deficiency signal outputted from said second level sensor, for controlling said solenoid valve to open a channel for said diluent water to flow to said second tank; and means, responsive to said output of said second flow rate sensor, for monitoring said flow of said diluent water such that if said flow rate of said diluent water after a predetermined time is within a predetermined range said stock solution pump is activated and if said flow rate of said diluent water is outside of said predetermined range, said emergency alarm generator is activated to generate an emergency alarm.

9. An automatic dampening water replenisher according to claim 8 wherein said emergency alarm generator generates an alarm when said concentration of said dampening water deviates from a predetermined range.

* * * * *